US005719597A

United States Patent [19]

Fong

[11] Patent Number: 5,719,597
[45] Date of Patent: Feb. 17, 1998

[54] APPARATUS FOR SCANNING USER INPUT DEVICES

[75] Inventor: Chi-ming Fong, Tai Po, Hong Kong

[73] Assignee: VTech Electronics, Ltd., Hong Kong, Hong Kong

[21] Appl. No.: 194,986

[22] Filed: Jan. 28, 1994

[51] Int. Cl.⁶ .................................................. G09G 5/00
[52] U.S. Cl. ............................... 345/174; 178/18; 341/26
[58] Field of Search ..................................... 345/168, 173, 345/174; 178/18, 19; 341/22, 26, 24

[56] References Cited

U.S. PATENT DOCUMENTS

| | | | |
|---|---|---|---|
| 4,015,254 | 3/1977 | Strandt | 340/365 S |
| 4,484,026 | 11/1984 | Thornburg | 178/18 |
| 4,555,693 | 11/1985 | Danish et al. | 341/26 |
| 4,571,454 | 2/1986 | Tamaru et al. | 178/18 |
| 4,649,232 | 3/1987 | Nakamura et al. | 178/18 |
| 4,678,869 | 7/1987 | Kable | 178/18 |
| 4,725,816 | 2/1988 | Petterson | 341/24 |
| 4,929,934 | 5/1990 | Ueda et al. | 178/18 |
| 5,283,558 | 2/1994 | Chan | 178/18 |

OTHER PUBLICATIONS

Video Painter Schematic Diagram, Video Technology Electronics, Ltd., Sep. 1, 1991 (Sheet 3 only).

*Primary Examiner*—Steven Saras
*Attorney, Agent, or Firm*—Dick and Harris

[57] ABSTRACT

A scanning apparatus for uniquely identifying an actuated key on a keyboard and an actuated location in a drawing tablet. The scanning apparatus includes independently actuatable switches associated with the keyboard. The scanning apparatus also includes vertical and horizontal conducting traces juxtaposed one to another and electrically connected to a horizontal and vertical resistive bar, respectively, associated with the drawing tablet. The switches and traces are energized under control of the apparatus such that portions of each can be actuated by a user resulting in the generation of unique analog signals indicative of the particular key and particular location upon the drawing tablet actuated by the user. These unique analog signals are converted to digital signals for further processing.

7 Claims, 2 Drawing Sheets

1

APPARATUS FOR SCANNING USER INPUT DEVICES

BACKGROUND OF THE INVENTION

The present invention relates in general to electronic input devices and, in particular, to a scanning apparatus for uniquely identifying an actuated key on a keyboard as well as a user-actuated location on a drawing pad.

Keyboards, whether they be for personal computers, calculators or toys, usually have a plurality of keys which are arranged in a row-column matrix. Depression, or actuation, of a key within this matrix results the completion of a circuit which connects one row to one column. Thus, the matrix can be "scanned" by feeding digital "1" (5 volts in TTL logic) to every column and reading the output from the rows or visa versa. Some polling systems alternatively apply digital "1" to both the columns and the rows. Either of these methods and other similar polling systems result in a unique digital word indicative of the row-column position of the actuated key. Of course, there are additional features which may be added to these basic scanning techniques to provide key debounce, error correction, protocol for handling multiple key actuation and the like.

One potential limitation of a prior art keyboard scanning device is the requirement that there be a physical connection between each row and each column comprising the keyboard matrix and the controller device which feeds voltage into the rows and columns and, in turn, detects the presence or absence of voltage toward determining which key has been pressed. Accordingly, a large number of keys increases the total count of rows and columns and thus the number of pins on the controller.

Drawing tablets, while long known in the computer field, have just recently become increasingly prevalent in the toy market. For instance, Sony Electronics markets a drawing tablet under the name SONY'S SKETCH PAD and Vtech Electronics markets a drawing tablet under the name VIDEO PAINTER. The basic concept of such drawing tablets are similar. A drawing area is mapped out using a lattice pattern of conducting material, such as silver traces. In one design, the vertical and horizontal traces forming the lattice are separated by a substantially non-conductive material, which allows for electrical conduction between the vertical and horizontal traces only when pressure is applied to a portion of the lattice.

The horizontal traces are individually connected along the length of a continuous vertical resistive bar, such that actuation of a particular horizontal trace would result in a voltage being applied to the vertical resistive bar at a location substantially "lined-up" with the actuated position. The vertical traces are individually connected along the length of a continuous horizontal resistive bar, so as to function in a manner similar to that of horizontal traces and vertical resistive bar.

In one design, the entirety of either the vertical or the horizontal traces are alternately energized, such that the voltage will cross from the vertical to the horizontal trace—substantially at the point of contact between the two or visa versa—and, in turn, appear on horizontal or vertical resistive bar, respectively.

In another design, the vertical and horizontal traces are disposed above a continually energized plane, such that actuation of a portion of the tablet causes the connection of the vertical and horizontal traces to the energized plane substantially at the point of actuation, which, in turn, will result in a localized voltage on both the horizontal and vertical resistive bars.

In either design, the location of the voltage on the continuous resistive elements will result in a voltage indicative of the location of the actuation. This analog voltage is converted to a digital signal using an analog-to-digital converter for further processing by the unit.

The present invention arises from the perceived desire for a drawing tablet combined with a keyboard, having a relatively economical cost. It is thus an object of the present invention to provide a scanning apparatus which is capable of scanning both a keyboard and a drawing tablet.

It is an associated object of the present invention to minimize the number of expensive components required to scan both a keyboard and a drawing tablet.

It is a further object of the present invention to minimize the number of pins required to accept various forms of user input.

These and other objects of the present invention will become apparent in light of the present specification, claims and drawings.

SUMMARY OF THE INVENTION

The present invention comprises a scanning apparatus for scanning both a keyboard and a drawing tablet. The scanning apparatus includes a keyboard; drawing tablet and means for scanning the keyboard and drawing tablet.

The keyboard includes a plurality of switches each being associated with a key on the keyboard and independently actuatable by a user. In a preferred embodiment, these switches are arranged in a matrix having at least one row and at least one column. In this preferred embodiment, the scanning apparatus includes means for generating first and second analog signals.

The first analog signal generating means includes means for producing a first plurality of voltages and means for outputting the first analog signal whose value is a function of one of the first plurality of voltages. This first analog signal is indicative of in which row the actuated switch is located. In this embodiment, the scanning apparatus additionally includes means for generating a second analog signal. The second analog signal generating means includes means for producing a second plurality of voltages and means for outputting the second analog signal whose value is a function of one of the second plurality of voltages. The second analog signal is indicative of in which column the actuated switch is located. The first and second analog signals together are indicative of the actuated switch. In another embodiment, having a linear keyboard arrangement only one analog generator means is required.

The drawing tablet includes a plurality of substantially vertical conducting traces, each being electrically connected to a horizontal resistive bar. The horizontal resistive bar has a resistance varying substantially linearly along its length. The drawing tablet further includes a plurality of substantially horizontal conducting traces being electrically connected to a vertical resistive bar. The vertical resistive bar also has a resistance varying substantially linearly along its length. The plurality of substantially horizontal conducting traces are juxtaposed with the plurality of substantially vertical conducting traces such that one substantially overlays the other in a lattice-like pattern.

In a preferred embodiment, the drawing tablet further includes means for partially isolating the plurality of substantially vertical conducting traces from the plurality of substantially horizontal conducting traces, such that when pressure is applied by the user at a point on the drawing tablet an electrical contact is made between one or more of the plurality of substantially vertical conducting traces and one or more of the plurality of substantially horizontal conducting traces at that point. In this embodiment, the drawing tablet also includes means for supplying a voltage to the vertical and horizontal resistive bars, which varies substantially linearly along the length of the bars, such that each one of the horizontal and vertical conducting traces have unique voltages indicative of its horizontal and vertical locations, respectively.

In this embodiment, the vertical voltage supplying means and the horizontal voltage supplying means are alternately energized such that only one of the vertical resistive bar and the horizontal resistive bar is energized at any one time. The vertical and horizontal resistive bar voltage supplying means further serve to obtain the horizontal and vertical voltages when each is respectively not energized. The horizontal voltage comprises a third analog signal and the vertical voltage comprises a fourth analog signal.

The scanning apparatus further includes means for converting the analog signals to digital signal. In a preferred embodiment, the converting means converts one of the analog signals at a time, however, it is contemplated that a converter means capable of converting multiple signals simultaneously could be used. In this preferred embodiment, the scanning apparatus further includes means for energizing the means for producing the first plurality of voltages, such that the first analog signal generating means produces the first analog signal only when the means for producing the first plurality of voltages is energized. This embodiment also has means for energizing the means for producing the second plurality of voltages, such that the second analog signal generating means produces the second analog signal only when the means for producing the second plurality of voltages is energized.

In this embodiment, the means for producing the first plurality of voltages additionally comprises the means for outputting an analog signal whose value is a function of one of the second plurality of voltages and the means for producing the second plurality of voltages also comprises the means for outputting an analog signal whose value is a function of one of the first plurality of voltages. Thus, each of the energizing means further includes means for causing the means for producing the first plurality of voltages and the means for producing the second plurality of voltages to float when each is not being energized.

The invention further comprises a method for scanning the keyboard and drawing tablet. This method includes the steps of: (a) energizing one of the first vertical resistive network, the second vertical resistive network, the first horizontal resistive network, and the second horizontal resistive network; (b) obtaining an analog signal from the one of the first vertical resistive network, the second vertical resistive network, the first horizontal resistive network, and the second horizontal resistive network having been energized; (c) converting the analog signal to a digital signal for use in processing; (d) communicating the digital signal to a processing device; and (e) repeating steps (a) through (e) for the next one of the first vertical resistive network, the second vertical resistive network, the first horizontal resistive network, and the second horizontal resistive network, such that each of the first vertical resistive network, the second vertical resistive network, the first horizontal resistive network, and the second horizontal resistive network are respectively energized in a substantially periodic fashion.

DETAILED DESCRIPTION OF THE DRAWINGS

Figure 1:
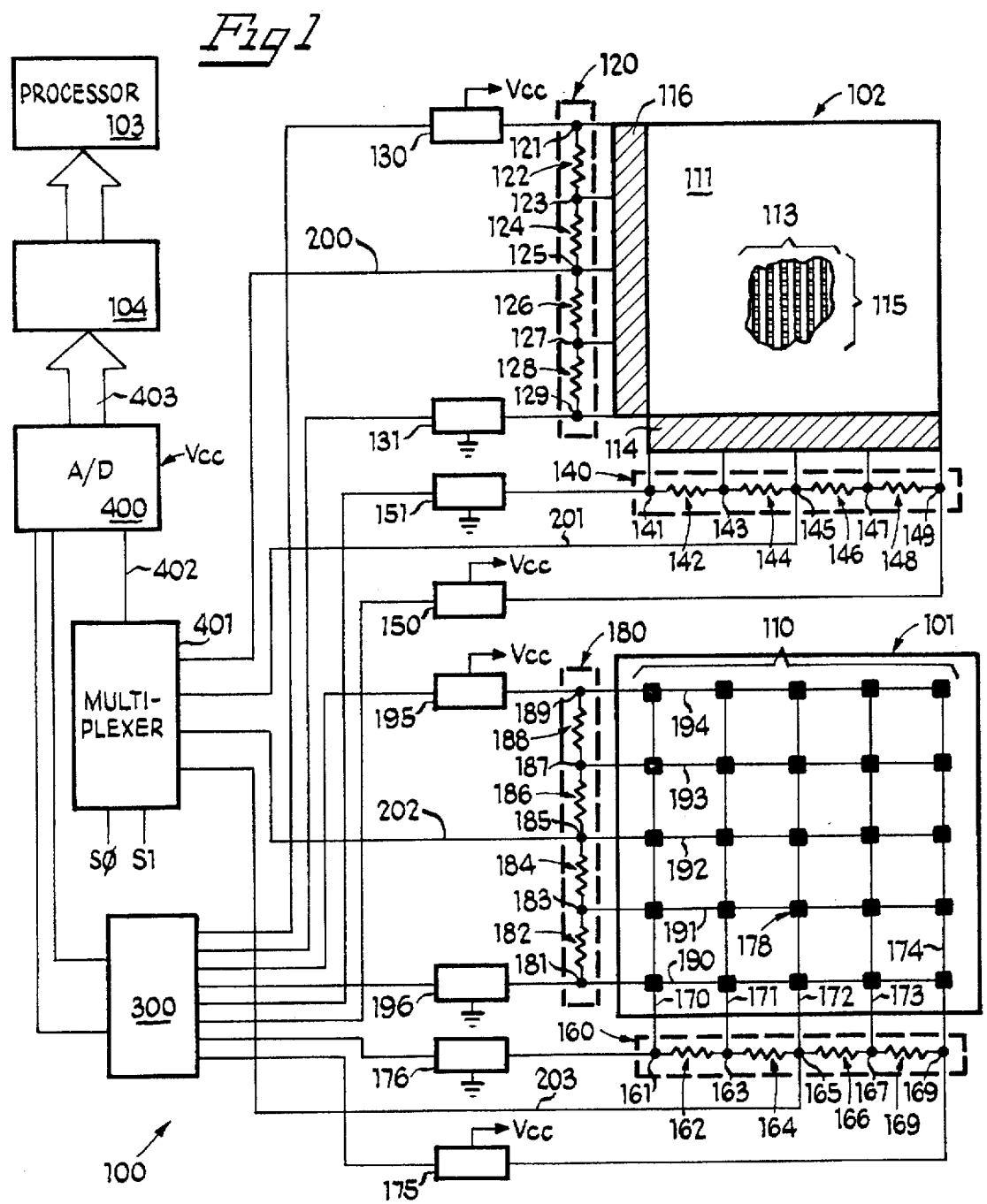
FIG. 1 of the drawings is a schematic-block diagram of the present scanning apparatus for user input devices.

While this invention is susceptible of embodiment in many different forms, two specific embodiments are shown in the drawings and will herein be described in detail, with the understanding that the present disclosure is to be considered as an exemplification of the principles of the present invention and is not intended to limit the invention to the embodiments illustrated.

FIG. 1 of the drawings is a schematic block diagram of scanning apparatus 100. Scanning apparatus 100 uniquely identifies an actuated key on keyboard 101 and an actuated location in drawing tablet 102 to processor 103. In a preferred embodiment, such identification is accomplished with multiple analog signals 200, 201, 202 and 203, which are later converted by converter means 400 to digital signals 401. Digital signals 401 may be held in buffer 104 until processor 103 is ready to receive and/or process such data.

Figures 1A, 1B, 1C, 1D:
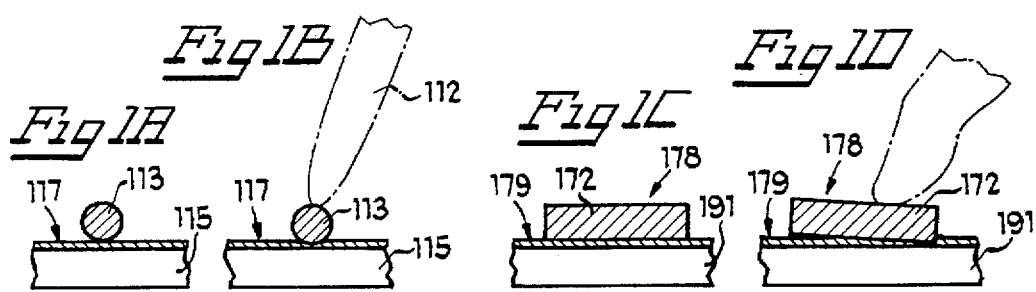
FIG. 1A of the drawings is an exploded front elevational view of a portion of one of the vertical and a portion of one of the horizontal conducting traces, as well as the isolation means in the drawing tablet in a preferred embodiment of the present invention.
FIG. 1B of the drawings is an exploded front elevation view of a portion of one of the vertical and a portion of one of the horizontal conducting traces, being actuated by a drawing stylus.
FIG. 1C of the drawings is an exploded front elevational view of one of the plurality of switches in the keyboard.
FIG. 1D of the drawings is an exploded front elevational view of a portion of one of the plurality of switches in the keyboard being actuated by a finger.

Keyboard 101 includes switches 110. In a preferred embodiment, as shown in FIG. 1, switches 110 are formed into a matrix of rows and columns with each of said switches being associated with a key on the face of keyboard 101. As shown in FIGS. 1C, 1D and 3, in this preferred embodiment, each switch is comprised of two conducting members separated by conductive ink 179. Upon actuation by a user (see FIG. 1D), the pressure increases the conducting properties of conductive ink 179 such that electrical contact can be made between the conducting members.

Figure 2:
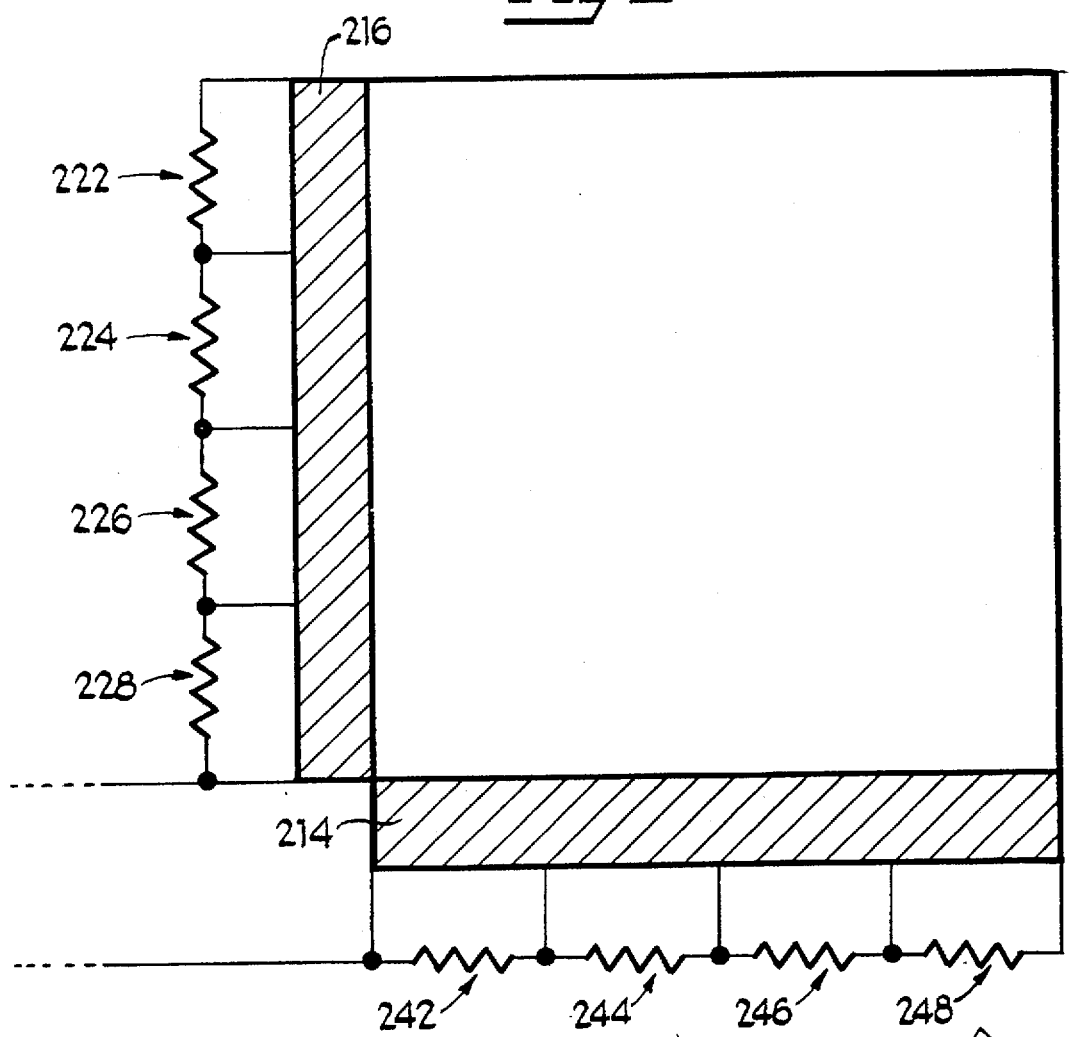
FIG. 2 of the drawings is a layout of one potential preferred embodiment of the matrix of switches.
Figure 2A:
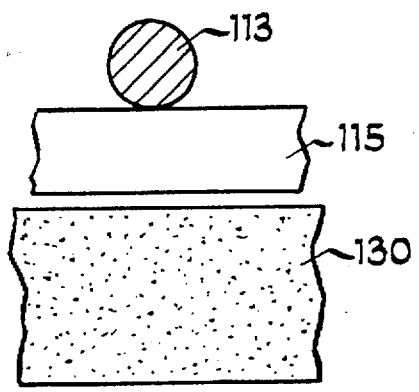
Figure 2B:
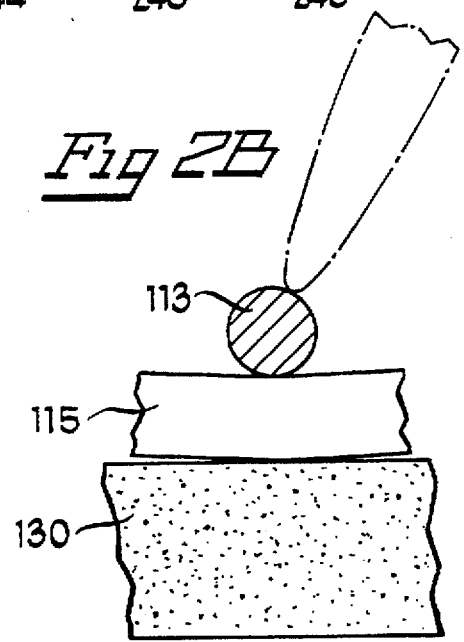

In fabricating keyboard 101, as shown in FIG. 2, for this preferred embodiment, switches 110 are laid out in two separate, but connected portions—one being overlayed on the other to form the row-column matrix. More particularly, portion 210 (corresponding to rows 190, 191, 192 193 and 194) is folded about line 211 and over portion 212 (corresponding to columns 170, 171, 172, 173 and 174), such that the parts of each of switches 110 align.

Keyboard 101 may be of any type known in the art (such as membrane or mechanical-key keyboards), of any size, any shape and have different types of indicia thereon to designate the functions of each such key and associated switch. While, such alterations may require modification of the construction or physical layout of switches 110 as well as to other portions of apparatus 100, such modifications would be understood by one with ordinary skill in the art having the specification and drawings before them.

Keyboard 101 further includes first generating means which generates analog signal 202. First generating means includes means for producing a first plurality of voltages 160, which, in a preferred embodiment, includes discrete resistors 162, 164, 166 and 168 in series, thus comprising a voltage divider having taps 161, 163, 165, 167 and 169. First generating means also includes first outputting means, which output one of the first plurality of voltages as analog signal 202 toward conversion to a digital signal by converter means 400.

First outputting means comprises columns 170, 171, 172, 173 and 174, each of which are electrically connected to taps 161, 163, 165, 167 and 169, respectively, such that each column has a discrete voltage. First outputting means further includes rows 190, 191, 192, 193 and 194 and, more particularly, the one of these rows which is electrically connected to one of the columns by the actuated one of switches 110, such as shown in FIG. 1D. While resistors 182, 184, 186 and 188 are electrically part of first outputting means, due to the high impedance input of converter means 400, such resistance is negligible to analog signal 202.

Additionally, keyboard 101 includes second generating means, which generates analog signal 203. Second generating means includes means for producing a second plurality of voltages 180, which, in a preferred embodiment, includes discrete resistors 182, 184, 186 and 188 in series, thus comprising a voltage divider having taps 181, 183, 185, 187 and 189. Second generating means also includes second outputting means which outputs analog signal 203 toward conversion to a digital signal by converter means 400. Second outputting means comprises rows 190, 191, 192, 193 and 194, each of which are electrically connected to taps 181, 183, 185, 187 and 189, respectively, such that each row has a discrete analog voltage. Second outputting means further includes columns 170, 171, 172, 173 and 174 and, more particularly, the one of these columns which is electrically connected to one of the rows by the actuated one of switches 110, as shown in FIG. 1D. While resistors 162, 164, 166 and 168 are electrically part of second outputting means, due to the high impedance input of converter means 400, such resistance is negligible to analog signal 203.

In this embodiment, scanning apparatus 100 also includes first energizing means, which supplies voltage to first generating means (via means for producing the first plurality of voltages 160). When first energizing means is supplying voltage, analog signal 202 is produced. First energizing means includes analog switches 175 and 176 and switch selector means 300. Analog switch 175 is tied to the supply voltage and analog switch 176 to ground.

Switch selector means 300 may be controlled by a processor, either processor 103 or possibly a processor located within converter means 400 and selects between the vertical switches (i.e., switches 130, 131, 195 and 196) and the horizontal switches (i.e., switches 150, 151, 175 and 176), alternatively, such that only the vertical or horizontal "axes" of both keyboard 101 and drawing pad 102 are energized at any one time.

In this preferred embodiment, scanning apparatus 100 further includes second energizing means, which supplies voltage to second generating means (via means for producing the second plurality of voltages 180). When second energizing means is supplying voltage, analog signal 103 is produced. Second energizing means comprises analog switches 195 and 196 and switch selector means 300, described above. Analog switch 195 is tied to supply voltage and analog switch 196 to ground. In this embodiment, each of the energizing means cause first and second generating means to float when each is not being energized.

Although keyboard 101 is shown in the drawings as having 5 rows and 5 columns, it would be obvious to one with ordinary skill in the art that the teachings herein are not limited to such a matrix. The number of rows and columns can be increased and/or decreased. Furthermore, the number of columns and number of rows in the matrix of keyboard 101 need not be equal. In fact, in a preferred embodiment shown in FIG. 2, keyboard 101 has five rows and thirteen columns. Of course, first and second generating means would require modification based on the number of rows and columns, as would be understood by one with ordinary skill in the art.

Apparatus 100 further includes drawing tablet 102. Drawing tablet 102 has drawing surface 111 upon which a user may use stylus 112 (as shown in FIG. 1B), a finger or other object to sketch various drawings. Beneath drawing surface 111 is disposed a plurality of vertical conducting traces 113, which in a preferred embodiment comprise silver traces. Each of vertical conducting traces 113 are electrically connected to horizontal resistive bar 114 along the entirety of its length at substantially regular intervals. Also beneath drawing surface 111 is disposed a plurality of horizontal conducting traces 115, which in this preferred embodiment also comprises silver traces. Each of horizontal conducting traces 115 are electrically connected to vertical resistive bar 116 along the entirety of its length at substantially regular intervals. Horizontal resistive bar 114 and vertical resistive bar 116 comprise separate carbon bars having a resistance varying substantially linearly along their length. Horizontal conducting traces 115 are thus juxtaposed with vertical conducting traces 113 such that one substantially overlays the other.

In one embodiment, as shown in FIGS. 1A and 1B, isolating means 117 is disposed between and partially isolates each of vertical conducting traces 113 from each of horizontal conducting traces 115. In a preferred embodiment, isolating means 117 is comprised of non-conductive ink. When pressure is applied by a user at a point on drawing surface 111, as shown in FIG. 1B, at least one of vertical conducting traces 113 and one of horizontal conducting traces 115 make electrical contact at that point, overcoming the non-conductive properties of isolating means 117.

In the embodiment having isolation means 117, scanning apparatus 100 further includes vertical voltage supplying means 120 which supplies voltage to vertical resistive bar 116. In this embodiment, as shown in FIG. 1, vertical voltage supplying means 120 includes discrete resistors 122, 124, 126 and 128 connected in series, which have substantially identical resistive values on the order of 100 ohms per resistor. Vertical voltage supplying means 120 further includes taps 121, 123, 125, 127 and 129, which connect discrete resistors 122, 124, 126 and 128 to vertical resistive bar 116 at substantially regular intervals, such that the voltage varies substantially linearly across the vertical resistive bar 116. This results in each of horizontal conducting traces 115 having a unique voltage indicative of its respective horizontal position within drawing tablet 102.

In this preferred embodiment, scanning apparatus 100 further includes horizontal voltage supply means 140 which supplies voltage to horizontal resistive bar 114. In this embodiment, as shown in FIG. 1, horizontal voltage supplying means 140 includes discrete resistors 142, 144, 146 and 148 connected in series, which have substantially identical resistive values on the order of 100 ohms. Horizontal voltage supplying means 140 further includes taps 141, 143, 145, 147 and 149 which connect the series resistive network of 142, 144, 146 and 148 to horizontal resistive bar 114 at substantially regular intervals, such that the voltage varies substantially linearly across the horizontal resistive bar 114. This results in each of vertical conducting traces 113 having a unique voltage indicative of its respective vertical position within drawing tablet 102.

The discrete resistors of vertical voltage supplying means 120 and horizontal voltage supplying means 140 need not be on the order of 100 ohms. However, the resistive values must be substantially identical to permit resolution between analog signals and achieve linearity of horizontal resistive bar 114 and vertical resistive bar 116.

In this preferred embodiment, vertical voltage supplying means 120 and horizontal voltage supplying means 140 are alternately energized by analog switches 130 and 131 and analog switches 150 and 151, respectively, such that only one of vertical resistive bar 116 and horizontal resistive bar 114 is energized at any one time. Analog switches 130 and 150 are tied to supply voltage and analog switches 131 and 151 to ground. These switches are controlled by switch selector means 300, which also controls energization of keyboard 101, such that the vertical axes of both keyboard 101 and drawing tablet 102 are energized simultaneously. The same is true of the horizontal axes.

In this embodiment, vertical voltage supplying means 120 further serves to obtain analog signal 200 when not energized and horizontal voltage supplying means 140 further serves to obtain analog signal 201 when it is not energized. In this preferred embodiment, while each of vertical voltage supplying means 120 and horizontal voltage supplying means 140 are serving to obtain and convey analog signal 200 and analog signal 201, the impedance of each is negligible when compared with the high-impedance exhibited by multiplexer 401 in combination with converter means 400. Thus, the voltages generated are substantially conveyed to converter means 400.

Finally, analog signals 200, 201, 202 and 203 are electrically connected through multiplexer 401 to converter means 400 for conversion into digital signal 403. In an embodiment wherein converter means 400 is capable of converting two analog signals separately signals 200 and 202 could be wire-or'ed together and analog signals 201 and 203 could also be wire-or'ed together, into separate conversion engines, however, in a preferred embodiment, converter means 400 converts one signal at a time. Such a conversion is quick enough to be substantially imperceptible to the user.

In operation, the preferred embodiment of apparatus 100 energizes one of vertical voltage supplying means 120 and second generating means or horizontal voltage supplying means 140 and first generating means, and, in turn obtains one of analog signals 201 and 203 or analog signals 200 and 202, respectively, from the non-energized axis, as discussed more fully hereinabove. The two obtained analog signals are fed into multiplexer 401, which selects one of the two signals under the control of a processor, which in the preferred embodiment is contained within converter means 401. In fact, multiplexer 401 is part of converter means 400 in a preferred embodiment in which converter means 400 comprises an 74C241N by Toshiba Corporation. Selected analog signal 402 is then fed into converter means 400 which converts selected analog signal 402 into digital signal 403. The number of bits comprising digital signal 403 is a matter of design choice dependent upon the bit width of converter means 400. In a preferred embodiment, digital signal 403 is 8-bits wide. This was selected to provide sufficient resolution for drawing tablet 102—it being realized that such bit width would be unnecessary for any practical keyboard. However, it should be noted that the present invention can support a keyboard of virtually any size, e.g., any number of keys, while still requiring only two output signals to uniquely encode the entire keyboard.

Once the conversion is completed, apparatus 100 energizes the other of vertical voltage supplying means 120 and signal generator means or horizontal voltage supplying means 140 and first generating means, so that after this cycle, both the "x-coordinate" and "y-coordinate" of an actuated location or the row-column location of an actuated switch is encoded digitally. The process continues such that these pairings are obtained for keyboard 101 and drawing tablet 102, alternatively.

The foregoing description and drawings merely explain and illustrate the invention and the invention is not limited thereto except insofar as the appended claims are so limited, as those skilled in the art who have the disclosure before them will be without departing from the scope of the invention.

What is claimed is:

1. A keyboard scanning apparatus for uniquely identifying which key a keyboard has been actuated by a user, said keyboard scanning apparatus comprising;

a plurality of switches, each of said switches being associated with a key on the keyboard and independently actuatable by said user, said plurality of switches being arranged in a matrix having at least two rows and at least one column;

means for generating a first analog signal, said first analog signal generating means including means for producing a first plurality of voltages and means for outputting said first analog signal whose value is a function of one of said first plurality of voltages, said first analog signal being indicative of one of said at least two rows in which said actuated switch is located;

means for generating a second analog signal, said second analog signal generating means including means for producing a second plurality of voltages and means for outputting second analog signal whose value is a function of one of said second plurality of voltage, said second analog signal being indicative of one of said at lease one column in which said actuated switch is located, such that said first and second analog signals together are indicative of said actuated switch;

means for converting said first and second analog signals to a digital signal, said digital signal being uniquely associated with said actuated switch on the keyboard, said converting means converting one of said first and second analog signals and thereafter converting the other of said first and second analog signals;

first means for energizing said means for producing said first plurality of voltages, such that said means for producing said first plurality of voltages, such that said first analog signals generating means produces said first analog signal only when said means for producing said first plurality of voltages is energized; and second means for energizing said means for producing said second plurality of voltages, such that said second analog signal generating means produces said second analog signal only when said means for producing said second plurality of voltages is energized;

a portion of said means for producing said first plurality of voltages also comprises said means for outputting said second analog signal and a portion of said means for producing said second plurality of voltages also comprises said means for outputting said first analog signal, each of said first and second energizing means further including means for causing said means for producing said first plurality of voltages and said means for producing said second plurality of voltages to float when each is not being energized.

2. The invention according to claim 1 wherein said first and second means for producing a plurality of voltages each comprises:
    a voltage source;
    a ground;
    a plurality of discrete resistive elements including a first resistor and a last resistor, said first resistor being connected to said voltage source and said last resistor being connected to ground, each of said resistive elements being electrically connected to one another in series;
    switch means for alternately connecting and disconnecting said voltage source to said first resistor and said ground to said last resistor; and
    a plurality of voltage taps associated with said plurality of switches, wherein each of said voltage taps are operably positioned at each of end of each of said plurality of discrete resistive elements, such that a unique voltage value exists at each of said plurality of voltage taps, wherein said unique voltage value defines a unique one of said plurality of switches.

3. A scanning apparatus for identifying an actuated key on a keyboard and an actuated location in a drawing tablet, said scanning apparatus comprising:
    said drawing tablet including:
        a plurality of substantially vertical conducting traces, each of said substantially vertical conducting traces being electrically connected to a horizontal resistive bar,
        a plurality of substantially horizontal conducting traces, each of said substantially horizontal conducting traces being electrically connected to a vertical resistive bar, said plurality of substantially horizontal conducting traces being juxtaposed with said plurality of substantially vertical conducting traces such that one substantially overlays the other,
        means for partially isolating said plurality of substantially vertical conducting traces from said plurality of substantially horizontal conducting traces, such that when pressure is applied by said user at a point on said plurality of substantially vertical conducting traces and said plurality of substantially horizontal conducting traces an electrical contact is made between said plurality of substantially vertical conducting traces and said plurality of substantially horizontal conducting traces at said point,
        means for supplying a voltage to said vertical resistive bar, said voltage varying substantially linearly along the length of said vertical resistive bar, such that each of said horizontal conducting traces have a different voltage indicative of their horizontal position,
        means for supplying a voltage to said horizontal resistive bar, said voltage varying substantially linearly along the length of said horizontal resistive bar, such that each of said vertical conducting traces have a different voltage indicative of their vertical position,
        said vertical resistive bar voltage supplying means and said horizontal resistive bar voltage supplying means being alternately energized such that only one of said vertical resistive bar and said horizontal resistive bar is energized at any one time,
        said vertical resistive bar voltage supplying means further serving to obtain said horizontal voltage when not energized, said horizontal voltage comprising a first analog signal, end
        said horizontal resistive bar voltage supplying means further serving to obtain said vertical voltage when not energized, said vertical voltage comprising a second analog signal;
    said keyboard including:
        a plurality of switches, each of said switches being associated with a key on the keyboard and independently actuatable by a user, and
        means for generating a third analog signal, said third analog signal generating means including means for producing a first plurality of voltages and means for outputting said third analog signal whose value is a function of one of said first plurality of voltages, said third analog signals being indicative of the value of an actuated switch; and
    means for converting said first, said second and said third analog signals to first, second and third digital signals.

4. A scanning apparatus for identifying an actuated key on a keyboard and an actuated location in a drawing tablet, said scanning apparatus comprising:
    said drawing tablet including:
        a plurality of substantially vertical conducting traces, each of said substantially vertical conducting traces being electrically connected to a horizontal resistive bar,
        a plurality of substantially horizontal conducting traces, each of said substantially horizontal conducting traces being electrically connected to a vertical resistive bar, said plurality of substantially horizontal conducting traces being juxtaposed with said plurality of substantially vertical conducting traces such that one substantially overlays the other,
        means for partially isolating said plurality of substantially vertical conducting traces from said plurality of substantially horizontal conducting traces, such that when pressure is applied by said user at a point on said plurality of substantially vertical conducting traces and said plurality of substantially horizontal conducting traces an electrical contact is made between said plurality of substantially vertical conducting traces and said plurality of substantially horizontal conducting traces at said point,
        means for supplying a voltage to said vertical resistive bar, said voltage varying substantially linearly along the length of said vertical resistive bar, such that each of said horizontal conducting traces have a different voltage indicative of their horizontal position,
        means for supplying a voltage to said horizontal resistive bar, said voltage varying substantially linearly along the length of said horizontal resistive bar, such that each of said vertical conducting traces have a different voltage indicative of their vertical position,
        said vertical resistive bar voltage supplying means and said horizontal resistive bar voltage supplying means being alternately energized such that only one of said vertical resistive bar and said horizontal resistive bar is energized at any one time,
        said vertical resistive bar voltage supplying means further serving to obtain said horizontal voltage when not energized, said horizontal voltage comprising a first analog signal, and
        said horizontal resistive bar voltage supplying means further serving to obtain said vertical voltage when not energized, said vertical voltage comprising a second analog signal;

said keyboard including:
- a plurality of switches, each of said switches being associated with a key on the keyboard and independently actuatable by a user, said plurality of switches being arranged in a matrix having at least two rows and at least one column,
- means for generating a third analog signal, said third analog signal generating means including means for producing a first plurality of voltages and means for outputting said third analog signal whose value is a function of one of said first plurality of voltages, said third analog signals being indicative of one of said at least one row in which an actuated switch is located, and
- means for generating a fourth analog signal, said fourth analog signal generating means including means for producing a second plurality of voltages and means for outputting said fourth analog signal whose value is a function of one of said second plurality of voltages, said fourth analog signals being indicative of one of said at least one column in which said actuated switch is located, such that said third and fourth analog signals together are indicative of said actuated switch; and
- means for converting said first, said second, said third and said fourth analog signals to first, second, third and fourth digital signals.

5. The invention according to claim 4 wherein said converting means converts one of said first, said second, said third and said fourth analog signals at a time, said invention further comprising:
- means for energizing said means for producing said first plurality of voltages, such that said first analog signal generating means produces said first analog signal only when said means for producing said first plurality of voltages is energized; and
- means for energizing said means for producing said second plurality of voltages, such that said second analog signal generating means produces said second analog signal only when said means for producing said second plurality of voltages is energized.

6. The invention according to claim 5 wherein a portion of said means for producing said first plurality of voltages also comprises said means for outputting said third analog signal and a portion of said means for producing said second plurality of voltages also comprises said means for outputting said fourth analog signal, each of said energizing means further comprising:
- means for causing said means for producing said first plurality of voltages and said means for producing said second plurality of voltages to float when each is not being energized.

7. A method for scanning a keyboard and a drawing tablet, in a system wherein
- the keyboard has a plurality of switches arranged in a matrix having a plurality of rows and columns, the keyboard also has first vertical and horizontal resistive networks, each of the rows terminating between resistive elements of the vertical resistive network and each of the columns terminating between resistive elements of the horizontal resistive network, the drawing tablet has a plurality of substantially vertical conducting traces, each of the substantially vertical conducting traces being electrically connected to a horizontal resistive bar, the drawing tablet further has a plurality of substantially horizontal conducting traces, each of the substantially horizontal conducting traces being electrically connected to a vertical resistive bar, the drawing tablet additionally has a partially non-conducting member which partially isolates the plurality of substantially vertical conducing traces from the plurality of substantially horizontal conducting traces, such that when pressure is applied at a point on the plurality of substantially vertical conducting traces and the plurality of substantially horizontal conducting traces, an electrical contact is made between the plurality of substantially vertical conducting traces and the plurality of substantially horizontal conducting traces at the point, the method comprising the steps of:

(a) energizing one of the first vertical resistive network, the vertical resistive bar, the first horizontal resistive network, and the horizontal resistive bar, wherein the step of energizing one of the vertical and horizontal resistive bars further includes the step of creating a substantially linearly varying voltage on the one of the vertical and horizontal resistive bars, such that each of the horizontal and vertical conducting traces have a different voltage indicative of their horizontal and vertical positions, respectively;

b) obtaining an analog signal from the energized one of the first vertical resistive network, the vertical resistive bar, the first horizontal resistive network, and the horizontal resistive bar via said one of the first vertical resistive network, the vertical resistive bar, the first horizontal resistive network, and the horizontal resistive bar associated with said energized one, but not having been energized;

(c) converting the analog signal to a digital signal for use in processing;

(d) communicating the digital signal to a processing device; and (e) repeating steps (a) through (e) for the next one of the first vertical resistive network, the vertical resistive bar, the first horizontal resistive network, and the horizontal resistive bar, such that each of the first vertical resistive network, the vertical resistive bar, the first horizontal resistive network, and the horizontal resistive bar are respectively energized in a substantially periodic fashion.

* * * * *